US007363266B1

(12) United States Patent  
Williams et al.

(10) Patent No.: US 7,363,266 B1
(45) Date of Patent: Apr. 22, 2008

(54) SYSTEMS AND METHODS FOR ASSET VALUATION

(75) Inventors: Daryl Gardner Williams, Orange, CT (US); Diana D'Agostino, Redding, CT (US)

(73) Assignee: General Electric Capital Corporation, Stamford, CT (US)

( * ) Notice: Subject to any disclaimer, the term of this patent is extended or adjusted under 35 U.S.C. 154(b) by 0 days.

(21) Appl. No.: 09/558,980

(22) Filed: Apr. 27, 2000

(51) Int. Cl.
*G06Q 40/00* (2006.01)
(52) U.S. Cl. .................................................. 705/36 R
(58) Field of Classification Search .................. 705/36, 705/37, 35, 7, 38, 39, 40, 1, 26, 8, 10; 380/279; 382/117; 707/104.1; 713/200
See application file for complete search history.

(56) References Cited

U.S. PATENT DOCUMENTS

| | | | | |
|---|---|---|---|---|
| 4,325,120 A | * | 4/1982 | Colley et al. ............... 711/202 |
| 4,551,719 A | * | 11/1985 | Carlin et al. ............... 340/825 |
| 4,625,080 A | * | 11/1986 | Scott ...................... 379/102.03 |
| 4,736,294 A | | 4/1988 | Gill et al. |
| 4,831,526 A | * | 5/1989 | Luchs et al. .................... 705/4 |
| 4,853,843 A | | 8/1989 | Ecklund ...................... 707/203 |
| 5,361,201 A | * | 11/1994 | Jost et al. ..................... 705/35 |
| 5,615,109 A | * | 3/1997 | Eder ........................... 395/208 |
| 5,774,883 A | | 6/1998 | Andersen et al. |
| 5,802,499 A | | 9/1998 | Sampson et al. |
| 5,835,375 A | * | 11/1998 | Kitamura ..................... 700/94 |
| 5,857,174 A | * | 1/1999 | Dugan ........................... 705/1 |
| 5,950,169 A | * | 9/1999 | Borghesi et al. ................ 705/4 |
| 6,016,504 A | * | 1/2000 | Arnold et al. ............... 709/200 |
| 6,064,971 A | * | 5/2000 | Hartnett ....................... 706/46 |
| 6,078,901 A | | 6/2000 | Ching |
| 6,125,355 A | | 9/2000 | Bekaert et al. |
| 6,151,582 A | * | 11/2000 | Huang et al. ................... 705/8 |
| 6,178,406 B1 | * | 1/2001 | Cheetham et al. ............ 705/10 |
| 6,178,430 B1 | * | 1/2001 | Cohen et al. ............. 715/501.1 |
| 6,185,614 B1 | * | 2/2001 | Cuomo et al. ............. 709/224 |
| 6,192,347 B1 | | 2/2001 | Graff |
| 6,321,205 B1 | * | 11/2001 | Eder ............................. 705/7 |
| 6,321,212 B1 | * | 11/2001 | Lange .......................... 705/37 |
| 6,347,302 B1 | * | 2/2002 | Joao ............................. 705/4 |
| 6,347,313 B1 | * | 2/2002 | Ma et al. ....................... 707/3 |
| 6,360,222 B1 | * | 3/2002 | Quinn ........................ 707/100 |
| 6,393,406 B1 | * | 5/2002 | Eder ............................. 705/7 |
| 6,405,204 B1 | * | 6/2002 | Baker et al. ................ 707/100 |
| 6,411,908 B1 | * | 6/2002 | Talbott ......................... 702/34 |
| 6,510,989 B1 | * | 1/2003 | Ortega ........................ 235/383 |
| 6,577,858 B1 | * | 6/2003 | Gell ............................ 455/407 |

(Continued)

FOREIGN PATENT DOCUMENTS

WO   WO 02/25533 A2 *  3/2002

OTHER PUBLICATIONS

Colleen M. O'Connor, Tough Issues Facing Down Equipment Leasing Industry, Private Placement Letter, New York, Nov. 11, 2002.*

(Continued)

*Primary Examiner*—Hani M. Kazimi
*Assistant Examiner*—Olabode Akintola
(74) *Attorney, Agent, or Firm*—Armstrong Teasdale LLP

(57) ABSTRACT

Methods and systems for providing a value of a good to a requester are described. In one embodiment, the method comprises uploading data relating to a request for a value of a good to a computer configured as a calculator for calculating the value of the good. The value then is calculated and displayed to a user.

65 Claims, 9 Drawing Sheets

U.S. PATENT DOCUMENTS

| | | | | |
|---|---|---|---|---|
| 6,622,129 | B1* | 9/2003 | Whitworth | 705/37 |
| 6,789,252 | B1* | 9/2004 | Burke et al. | 717/100 |
| 6,810,401 | B1* | 10/2004 | Thompson et al. | 707/101 |
| 7,069,227 | B1* | 6/2006 | Lintel et al. | 705/4 |
| 2003/0014352 | A1* | 1/2003 | Marzan | 705/37 |

OTHER PUBLICATIONS

Intermediate Accounting, Sixth Edition, Donald E. Kieso et al., John Wiley & Sons, 1989, Chapter 22 on Leasing.*

James G. Squyres, "A Quick Peak According to Graham and Dodd" in Journal of Financial Statement Analysis, Fall 1998; 4:1, p. 79.*

No Author, "Kelley Blue Book® teams with AutoNation to introduce online 'Virtual Walkaround'", PR Newswire, Apr. 24, 2000.*

"Kelly Blue Book ® Teams with AutoNation to introduce Online 'Virtual Walkaround'" PR Newswire, New York, Apr. 24, 2000.*

"Solimar.Net Introduces online valuation service for residential Appraisers", Business Wire, New York, Feb. 15, 2000.*

* cited by examiner

SYSTEMS AND METHODS FOR ASSET VALUATION

BACKGROUND OF THE INVENTION

This invention relates generally to asset valuation and more specifically to computerized methods and systems for providing values of equipment to a sales industry.

An equipment sales force needs prompt and accurate equipment values. Liquidation value, residual value, purchase option value and fair market (net realizable) value quotes are used for pricing new business, structuring deals and assessing the risk level of those deals. A quote is a value of a good provided in response to a request for the value of that good. Currently, sales forces typically send in requests for residual quotes to asset management and analysis groups.

Known asset valuation methods and systems have several disadvantages. For example, current asset valuation methods and systems are largely paper-based. Multiple groups of employees provide new information and the accuracy of the information depends on the experience and knowledge of the employees. In addition, using known methods and systems can be time consuming. The current paper-based systems utilize huge paper storage areas that make querying and researching difficult. For quotes on the value of unusual goods or exceptions, the minimal response time is typically longer than desired. This is due in part to the fact that the current systems and methods do not allow retrieval of old exception quotes and have no reporting capability. Therefore, every exception involves additional research. In automated asset valuation methods and systems, the asset values typically reside on multiple servers that are sometimes unable to communicate with other systems, utilizing extensive information technology intervention for updating and retrieving data, which results in time delay and increased costs.

It would be desirable to provide computerized asset valuation methods and systems that provide greater access to quotes to a sales industry without the investment of time, money and resources common for known methods and systems.

BRIEF SUMMARY OF THE INVENTION

The present invention, in one aspect, is a method for providing computerized-asset valuation. The method includes the steps of uploading data relating to a request for a value of a good and data related to that good to a computer configured as a calculator for calculating the value of that good. The value of the good is calculated and then displayed to a requester.

In another aspect, the present invention is a system for providing a computerized-asset valuation. The system includes at least one computer. The system further includes a server configured to read input data relating to a request for a value of a good and data relating to that good, and to calculate the value of that good. The system is further configured to be a server for the computer. The system also includes a network connecting the server to the computer and an interface that allows a requester to input the data and in return receive the value requested.

DETAILED DESCRIPTION OF THE INVENTION

The present invention, in one aspect, is a computerized method for prompt and accurate asset valuation. The computerized method reduces the manual effort required to conduct asset valuation and reduces the potential for data entry errors.

Figure 1:
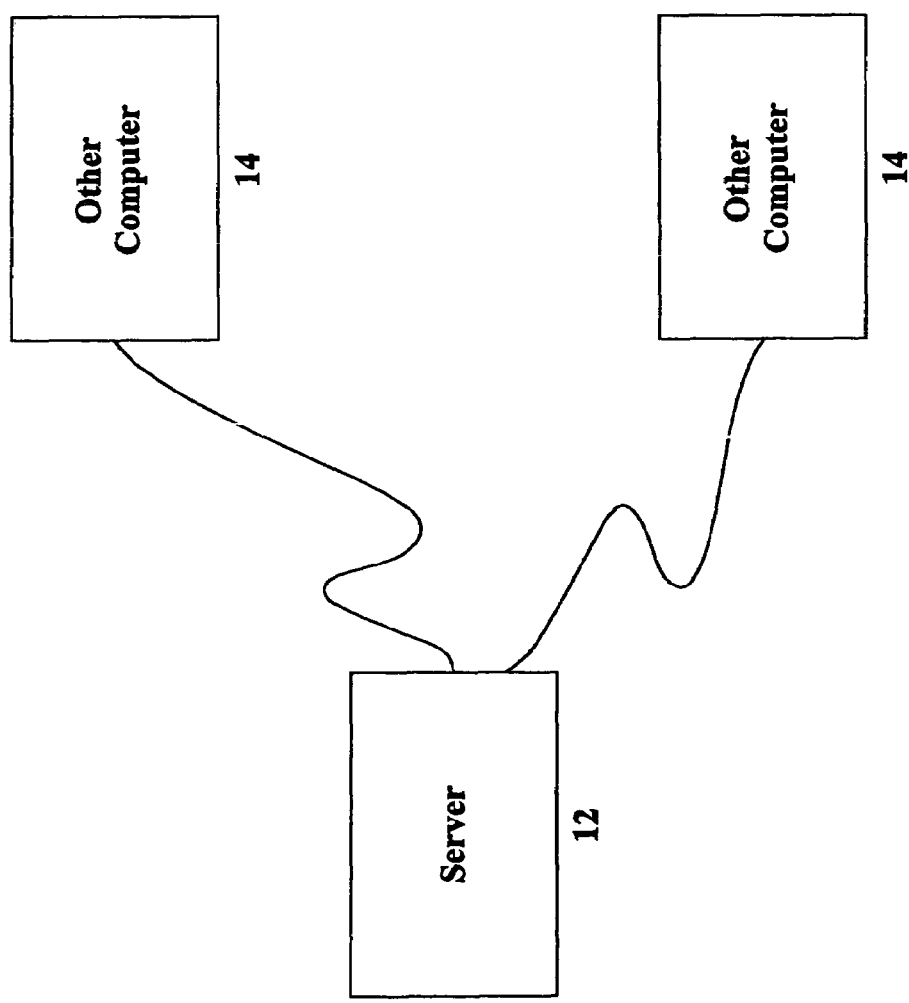
FIG. 1 is a system block diagram.

More specifically, FIG. 1 illustrates a system 10 in accordance with one embodiment of the present invention. System 10 includes a computer configured as a server 12 and a plurality of other computers 14 coupled to the server 12 forming a network of computers. The network of computers may be local area networks (LAN) or wide area networks (WAN). System 10 includes a computer configured as server 12 and an interface.

The computer configured as server 12 is configured to read input data relating to a request for a value of a good and data relating to that good and to calculate the value of the good. The interface allows a user to input data relating to a request for the value of a good and data relating to that good, and displays the value of the good. In one embodiment, server 12 is coupled to computers 14 via a WAN or LAN. A user may dial or directly login to the Intranet or Internet to gain access. Each computer 14 includes an interface for communicating with server 12. The interface allows a user or requester to input data relating to a request for the value of a good and data relating to that good and to receive the value of the good output. A computerized asset valuation tool, as described below in more detail, is stored in server computer 12 and can be accessed by a requester at any one of computers 14.

According to the method of the present invention, a requester may obtain an asset valuation using a computer configured to calculate the value of the particular good. The method includes uploading to the computer data relating to a request for a value of a good and data relating to the good. The computer then calculates and displays the value. In one embodiment, the data may be submitted to the computer via an Internet. In another embodiment, the data may be submitted via an Intranet. In yet another embodiment, the data can be uploaded by accessing a computer configured as a server.

The computer configured as a calculator for calculating the value of a good may be configured to calculate any requested value. Policy values and exception values may be requested. Policy values are values developed for "core" collateral and most common specifications. Exception values are values for unusual collateral types or specifications that are not regularly seen. The calculation of exception values typically involve more research. The additional research is generally manual research. One embodiment of the present invention that provides a computerized asset valuation method for exception values is discussed in more detail below. Examples of values that the computer can be configured to calculate include, but are not limited to residual value, net realizable value, purchase option value and orderly liquidation value.

In an exemplary embodiment, residual factors are used to calculate the value of a good, for example, an over-the-road truck. Data relating to at least one residual factor is received and stored to a computer configured as calculator for calculating a value of a good. Residual factors are factors that affect a calculation of a value. Examples of residual factors include, but are not limited to horsepower, transmission, estimated annual mileage, wheels, engine, sleeper, additional options and factors that relate to depreciation.

The value may be calculated using standard asset value calculation methods. A residual value calculation is related to the asset classification. For example, and in one embodiment, residual value is calculated as ([(base value)+Σbase value modifiers]*residual value look up)*depreciation value look up for a lease term. In another embodiment, residual value is calculated as cost*residual value look up for a lease term. In yet another embodiment, residual value is calculated as depreciation value look up*residual value look up for a lease term. A look up value is a pre-defined value related to residual value, net realizable value, depreciation value and purchase option value, organized in accordance with a table or database.

In another specific embodiment, net realizable value is calculated. A net realizable value calculation is related to the asset classification. For example, and in one embodiment, net realizable value is calculated as ([(base value)+Σbase value modifiers]*net realizable value look up)* depreciation value look up for a lease term. In yet another embodiment, net realizable value is calculated as cost* net realizable value lookup for a lease term. In a further embodiment, net realizable value is calculated as depreciation value look up* net realizable value look up for a lease term. As used herein, cost includes equipment cost and total transaction cost.

In yet another specific embodiment, the purchase option value is calculated. The purchase option value calculation is related to the type of asset classification. For example, and in one embodiment, purchase option value is calculated as residual value+((cost/quantity)*purchase option value look up)

for a lease term. In another embodiment, purchase option value is calculated as residual value+(cost*purchase option value look up)

for a lease term.

According to one embodiment of the present invention, data relating to a request for a value of a good can be any data beneficial to the calculation of that value. One example is lease information. Lease information may be any information relating to a lease. Lease information includes, but is not limited to lease term, lease type and lease options.

According to the present invention, a good may be anything that has utility. Examples of goods include, but are not limited to equipment, trucks and cars. In one embodiment, the good is equipment. Data relating to goods may be any data related to the goods. Examples of data relating to the goods include, but are not limited to type, manufacture, model, status, quantity and options. In one embodiment, the value of equipment is provided. Data relating to equipment includes, but is not limited to type, manufacture, model, status, quantity and options.

The value may be displayed in any manner allowable by computer 14 or server 12. In one embodiment, the value is displayed within a summary report.

Figure 2:
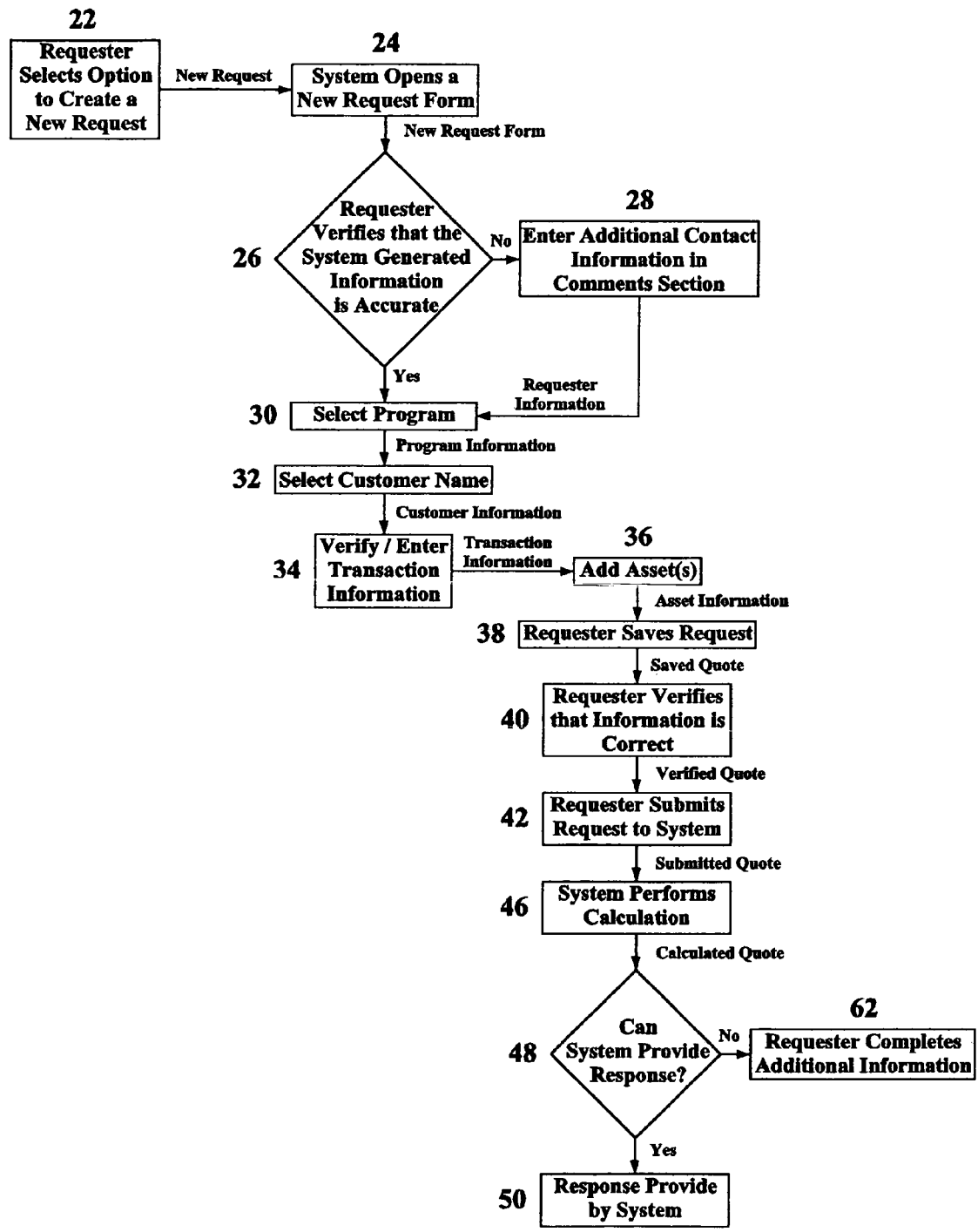
FIG. 2 is a flow chart diagramming an embodiment creating a request.

Referring to FIG. 2, a flow chart 20 for process steps executed in creating a new request is shown. More specifically, a requester can select 22 an option to create a new request. The interface is configured for receiving and storing the new request. As used herein, a request includes data relating to the request, data relating to the good being valued and data relating to the value or quote provided. Upon receipt of the request, system 10 opens 24 a new request form, and the requester may then verify 26 whether system 10 has generated accurate information. If the requester verifies 26 that the information is accurate, the requester may then select 30 a program. If the information is not accurate, additional contact information may be entered 28 in the comments section by the requester.

After a program is selected 30, a customer name is selected 32 by the requester. The transaction information is then verified and entered 34 into system 10. Asset information is then added 36 by the requester and the requester then saves 38 the request. The requester then verifies 40 that the information is correct, and submits 42 the request to server 12.

System 10 then performs 46 a calculation using the submitted information. If system 10 can provide a response 48, a response is provided 50. If system 10 cannot provide 48 a response, the request is an exception request, and the requester completes 62 additional information.

In one embodiment of the invention, the step of creating a new request further includes loading at least one field for an input value. In still another embodiment of the invention, the step of calculating a value further includes a step of using at least one input policy value and input changes for calculating the particular value. The method of storing is not critical. For example, an existing policy value includes a policy value stored on system 10, within a database, floppy disk or on the computer's hard disk.

As goods and products are introduced into the market, it may be beneficial to add or delete information relating to the goods to be valued. Accordingly, in another embodiment of the invention, a user may add or delete information relating to a new good or asset. The information is received and stored in system 10.

Figure 3:
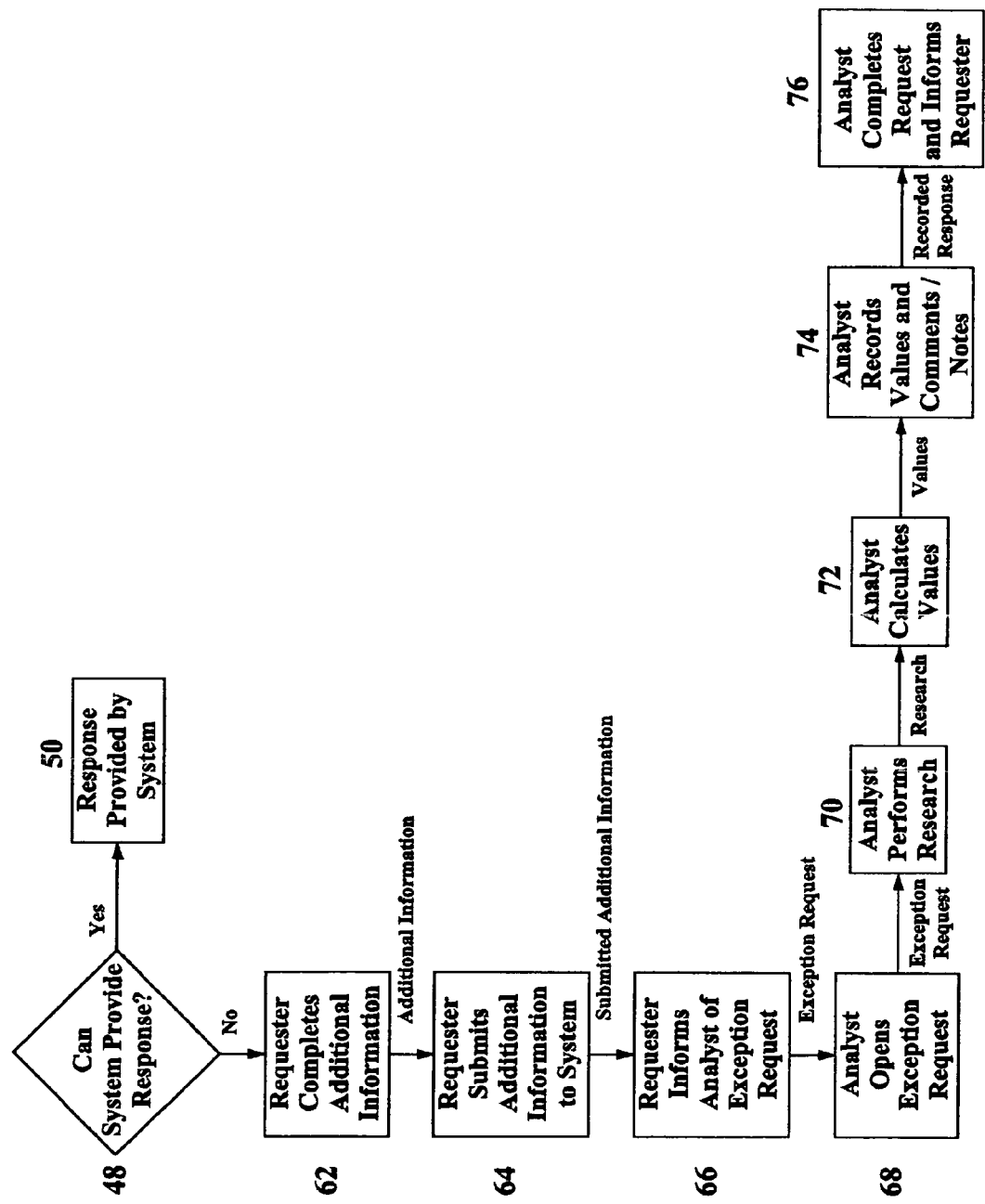
FIG. 3 is a flow chart diagramming an embodiment submitting an exception request.

Referring to FIG. 3, a flow chart 60 for process steps executed in submitting an exception request is shown. In this embodiment of the invention, the computer is configured to recognize an exception request. If system 10 can provide 48 a response, a response is provided 50. If a response cannot be provided 50, the request is an exception request. An exception request, in general, is a request for a value of a good that is an unusual collateral type or that has specifications not regularly seen. More research is involved for exception requests. The additional research is typically manual research. Examples of exception requests include, but are not limited to requests wherein multiple classifications are within one request, requests wherein "other" is specified as an asset detail, requests wherein a predetermined parameter is exceeded, requests wherein a classification is not an option in the pull down classification box and requests wherein the total classification cost exceeds a maximum cost specified. In one embodiment, the requester completes 62 additional information and submits 64 the additional information to system 10.

In a specific embodiment, additional information for calculating a value of an exception request is received and stored. When the requester submits 64 additional information for the exception request, the analyst is informed 66 of the existence of the exception request. The analyst may be informed manually or by system 10. Typically, and in one embodiment, a "button" on a computer display labeled "SUBMIT" is utilized to send the additional information to an analyst and to inform the analyst of the existence of the exception request. The analyst opens 68 the exception request and performs 70 research. The analyst calculates 72 and records 74 the values and may make comments and/or notes on system 10. When the analyst completes 76 the exception request the requester is informed of the calculated value via system 10 or manually.

In yet another embodiment, system 10 is configured to recognize trends in similar or duplicate exception requests. System 10 will trigger an analyst to add additional policy values into system 10 when a trend in similar exception requests is recognized. Therefore, once a trend in similar exception requests is recognized an analyst is triggered to provide a policy value to system 10 and the following similar exception requests will not be actual exception requests requiring manual research from an analyst. System 10 can calculate and display the requested values to the requester. As such, the present invention reduces the number of true exception requests to be manually researched by the analysts.

Figure 4:
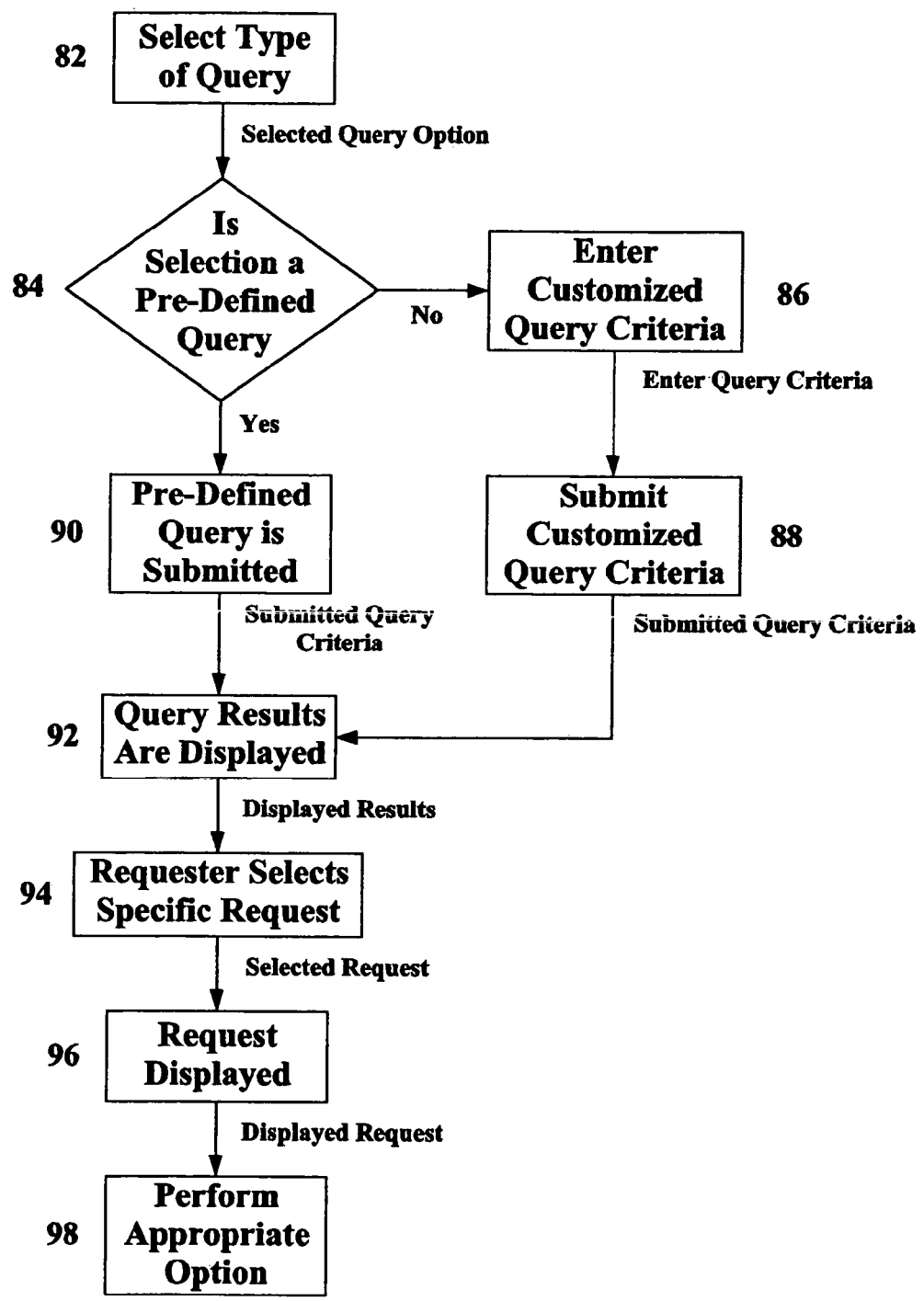
FIG. 4 is a flow chart diagramming an embodiment querying existing quotes.

Referring to FIG. 4, a flow chart 80 for process steps executed in querying existing requests is shown. More specifically a requester may select 82 the type of query. If the selection is determined 84 to be a pre-defined query it is stored on system 10. If the selection is not a pre-defined query request, the requester enters 86 customized query criteria. Customized query criteria is query criteria including specific attributes of particular goods desired by a user or previous requests submitted by a user. The requester submits 88 customized query criterion to system 10 and the query results are displayed 92. If the selection is a pre-defined query, the pre-defined query is submitted 90 and the results are displayed 92. System 10 determines that the selection is a pre-defined query by using pre-defined parameters for recognizing a pre-defined query. Then, the requester selects 94 a specific request, which system 10 displays 96 and performs 98.

In a specific embodiment of the invention, query options may be available based on time period, total transaction cost, asset attributes, quote number, organization and "good thru" dates.

Figure 5:
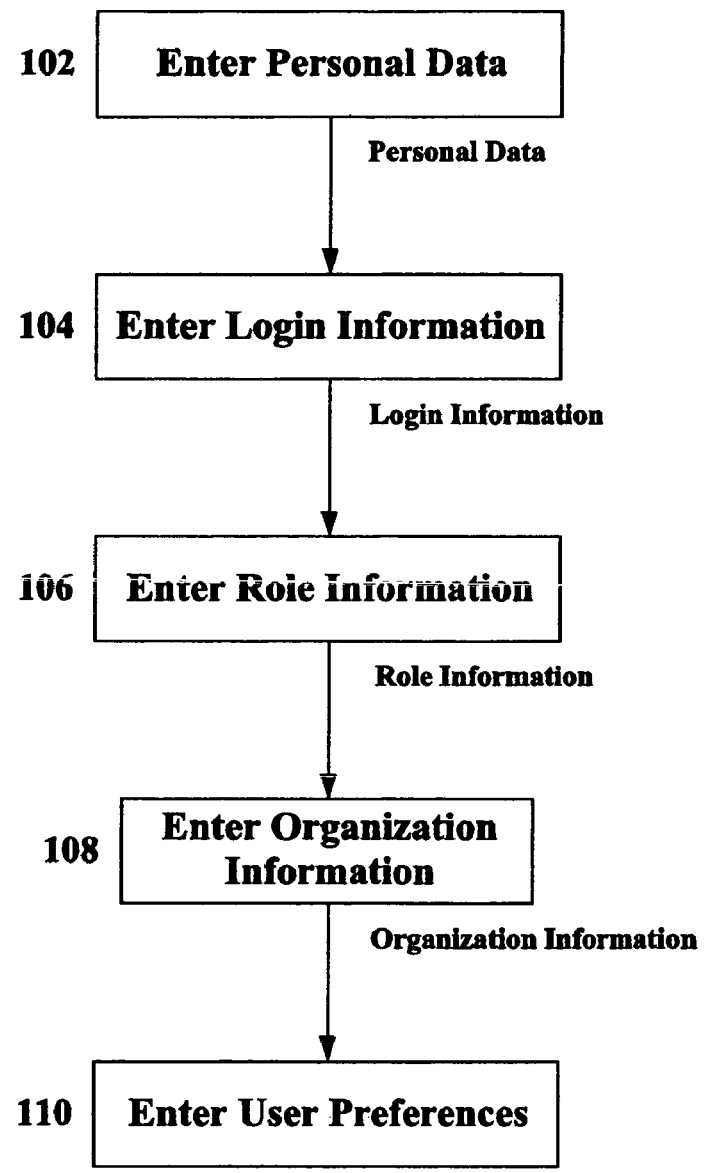
FIG. 5 is a flow chart diagramming an embodiment entering profile information.

Referring to FIG. 5, a flow chart for process steps executed in entering profile information is shown. In many situations, it may be desirable to track users of system 10 (shown in FIG. 1). The role of the user may determine the home page presented to the user upon successful login. As such, one embodiment of the present invention further includes uploading profile information to be stored and received into system 10. Profile information may be any information used to identify a user. Examples of profile information, include but are not limited to personal data such as name, address and contact information, login information such as a user identification number, password information to provide restrictions on access, role information such as position or job ranking, organization information such as business unit or division, and preferences. Personal data is entered 102 by the requester or user. More specifically, the requester or user may enter 104 login information. The requester or user may also enter 106 role information. Organization information, if applicable, may be entered 108 as well. Preferences may be entered 110 by the requester or user. User preferences may be defined in any manner. Examples of user preferences include currency and language.

In one embodiment of the invention, profile information is received and stored for future identification of system 10 users. In yet another embodiment of the invention, profile information is analyzed to provide restricted access to system 10. For example, users of system 10 may have several roles such as System Administrator, Analyst, Credit and Sales. An organization may desire, for security purposes, that only the Analyst and Sales roles have access to certain categories of requested quotes or certain functions. For example, it may be desirable to restrict an embodiment of the present invention allowing editing of existing values to Analyst only.

Figure 6:
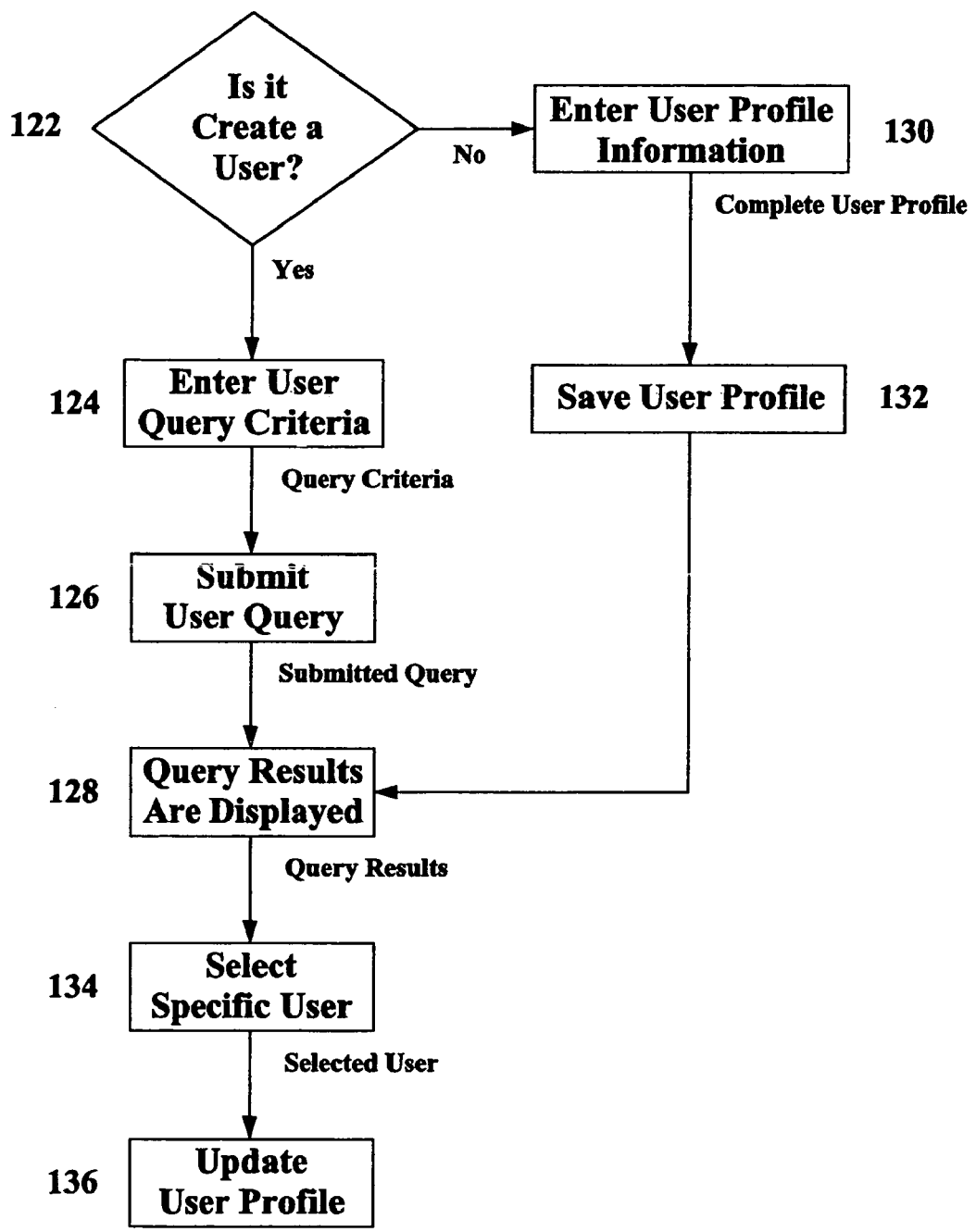
FIG. 6 is a flow chart diagramming an embodiment creating a user.

Referring to FIG. 6, a flow chart 120 for process steps executed in creating a user is shown. System 10 determines 122 whether a user is to be created. If so, the requester enters 130 profile information. System 10 receives and saves 132 the profile information and then displays 128 the query results. If a user is not to be created, the requester then enters 124 and submits 126 query criteria. System 10 displays 128 the query results and the requester then selects 134 a specific user. The user profiled is then updated 136 by system 10.

Figure 7:
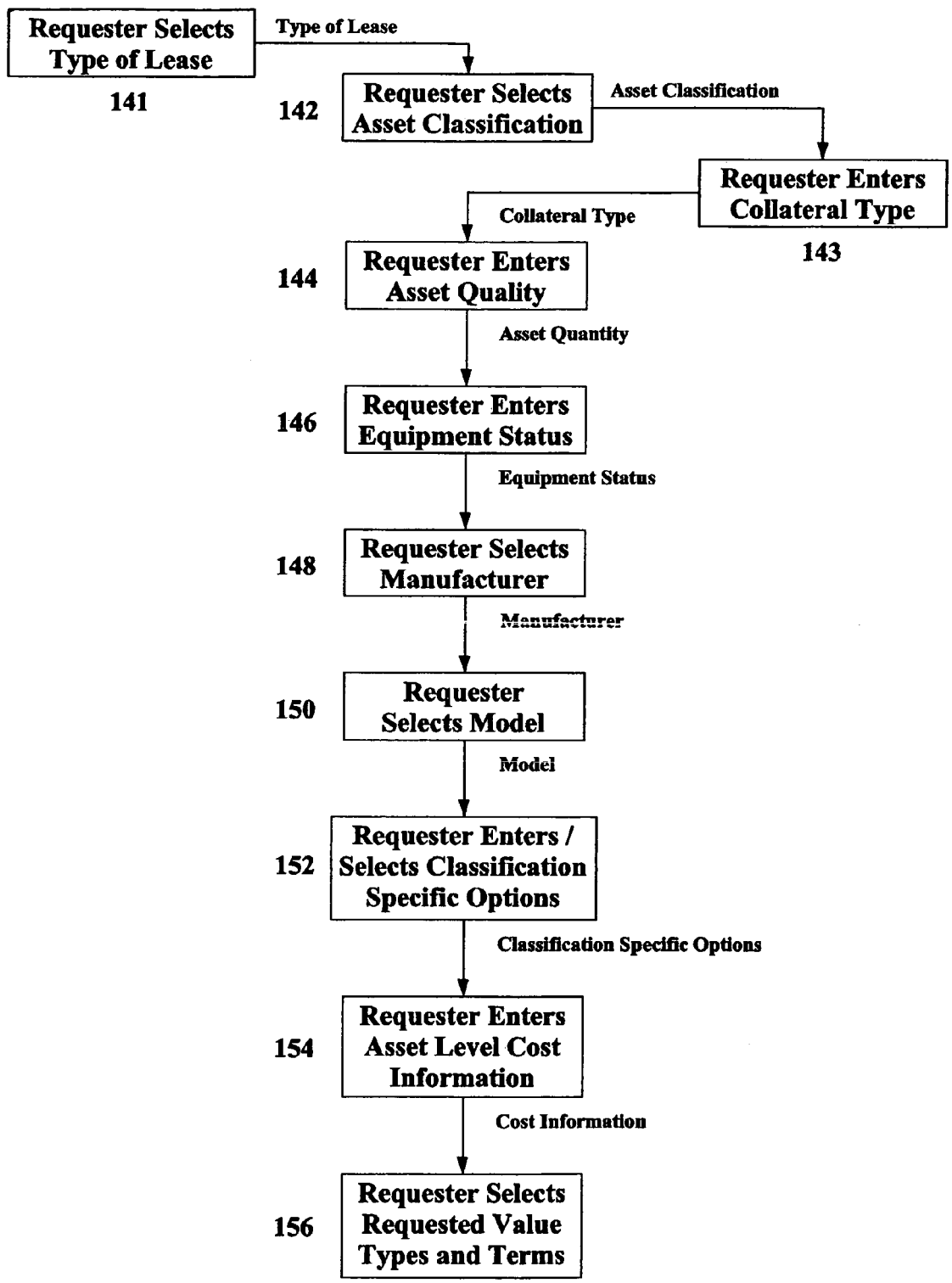
FIG. 7 is a flow chart diagramming an embodiment submitting a request.

Referring to FIG. 7, a flow chart 140 for process steps executed in submitting a request is shown. More specifically, the requester selects 141 the type of lease and selects 142 an asset classification. The requester then enters 143 a collateral type and enters 144 an asset quantity. The requester thereafter enters 146 equipment status and selects 148 a manufacturer. The requester then selects 150 a model, if applicable, and selects 152 any classification specific options. The requester also enters 154 asset level cost information and selects 156 requested value types and terms. In a specific embodiment, the requester may also enter comments.

In one embodiment of the invention, system 10 receives and saves a new request. The new requests are saved, in part, to capture the number of requests received for a particular good or collateral type. Using this information, an analyst can perform trend analysis relating to the number and type of goods for which values have been requested.

Figure 8:
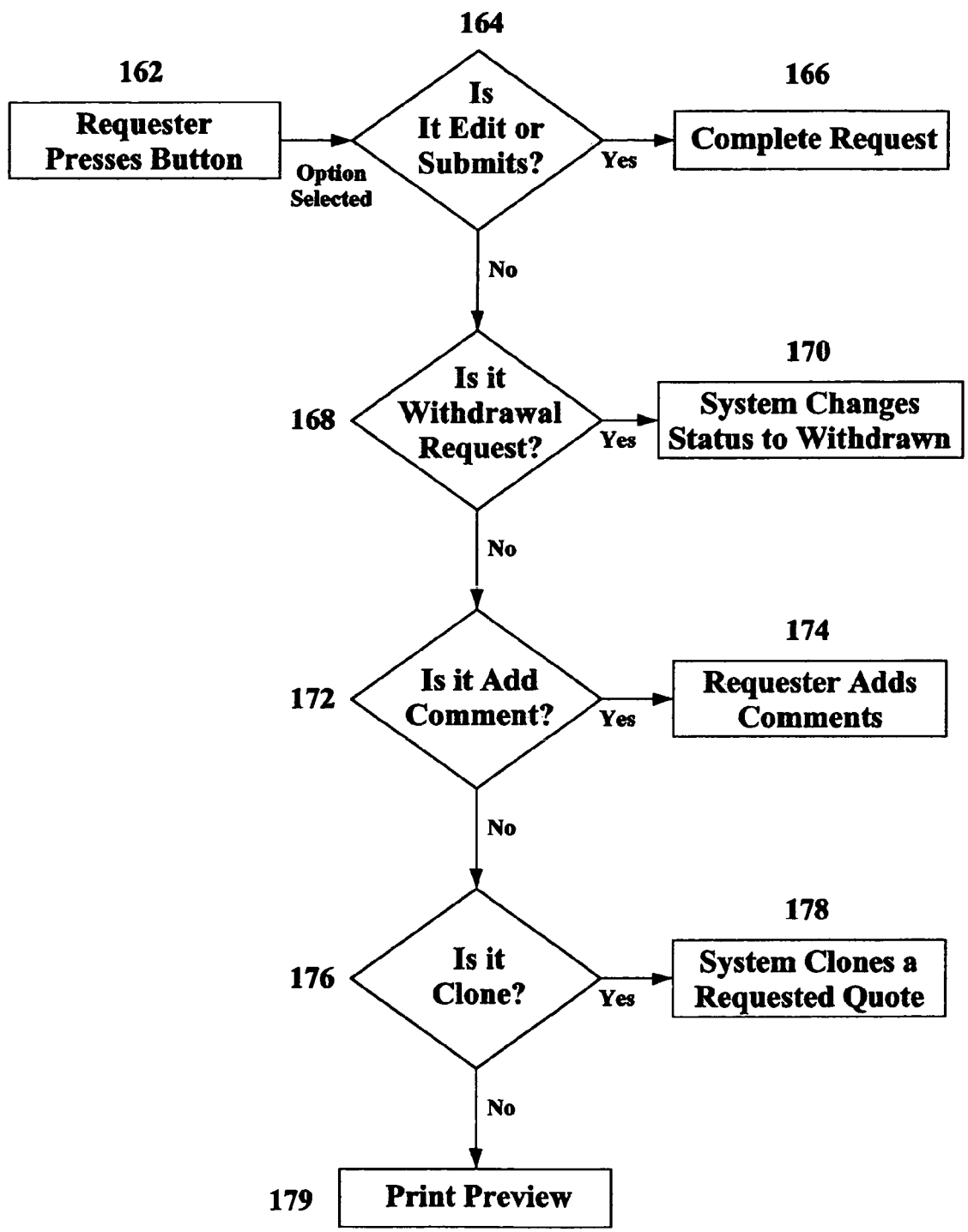
FIG. 8 is a flow chart diagramming an embodiment editing or submitting a request for a value.

Referring to FIG. 8, a flow chart 160 for process steps executed in editing or submitting a new request is shown. More specifically, the requester may press 162 a "button" to select an option to "EDIT" or "SUBMIT" a request. After a sales or credit user performs a query on existing quotes and in one embodiment of the invention, the requester may edit a quote. Editing may be by quote or request number, customer number, status, or any identifier that the requester chooses. If a requester desires 164 to edit or submit a request or quote system 10 completes 166 the request.

In one specific embodiment of the invention, a requester may withdraw a new request. If a requester does not desire to edit or submit a request, the requester may withdraw a request. If so, system 10 changes 170 to withdrawn status.

In another specific embodiment of the invention, comments may be received with a request. If the requester does not desire to withdraw a request, the requester may add 172 comments to a request.

In a further embodiment of the invention, a user may clone an existing request to create a new quote. Cloning means that all information from an existing request is copied to a new quote. If the requester does not add 174 comments, the requester may clone 176 an existing quote. If the requester desires to clone 178 an existing quote, system 10 will clone the existing quote. If the requester does not desire to clone 178 an existing quote, system 10 will preview 179 printing.

Figure 9:
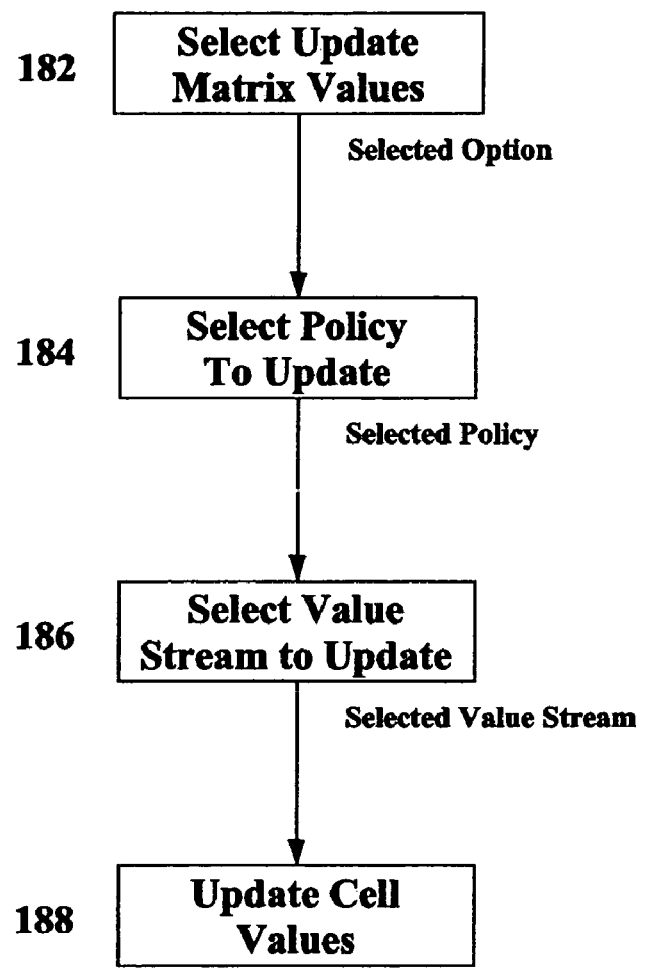
FIG. 9 is a flow chart diagramming an embodiment updating matrix values.

Referring to FIG. 9, a flow chart 180 for process steps executed in updating matrix values is shown. Matrix values may be updated by an analyst according to this embodiment. Information technology intervention is not necessary. Examples of matrix values include, but are not limited to policy values, value streams and cell values. More specifically, the requester selects 182 an option to update matrix values then selects 184 the policy to update. The requester then selects 186 the option to update the value stream and selects 188 the cell values to be updated.

Although not shown in each figure, typically, and in one embodiment of the invention, a requester may select an option by pressing or clicking on a "button" labeled "SELECT" or "OKAY." In addition, typically, and in one embodiment of the invention, a requester submits information to system 10 by pressing or clicking on a "button" labeled "SUBMIT." Further, and in one embodiment of the invention, a requester saves information to system 10 by pressing or clicking on a "button" labeled "SAVE."

While the invention has been described in terms of various specific embodiments, those skilled in the art will recognize that the invention can be practiced with modification within the spirit and scope of the claims.

What is claimed is:

1. A method for providing a value of a good to a requester using a local computer coupled to a database and in communication with a remote computer, the remote computer controlled by an analyst, said method comprising the steps of:

storing in the database data relating to a plurality of goods including a description of each good, wherein each good includes a non-stationary asset including at least one of equipment, a product, a truck, an automobile and a vehicle;

assigning a policy value to at least one good stored in the database;

entering data into the local computer including a request for a value of a good and data relating to the good, the local computer configured as a calculator for calculating a value of the good;

using the local computer to determine whether the value of the good can be calculated based on the entered data including determining whether the good has a policy value assigned thereto;

designating the request for the value of the good as an exception request if the local computer is unable to value the good based on the data stored within the database and the entered data, a request for the value of a good is designated as an exception request if the local computer determines that the corresponding good does not have a policy value assigned to the good and that input from the analyst is required for valuing the good;

displaying a web page indicating that the request has been designated by the local computer as an exception request and prompting the requester to provide additional information relating to the good;

prompting the requester to transmit the entered data and the additional information to the remote computer controlled by the analyst;

researching by the analyst the value of the good including analyzing data external to the database based on the entered data and the additional information;

calculating the value of the good based on the research performed by the analyst;

analyzing trends among a plurality of similar exception requests including the calculated values of the goods associated with the similar exception requests, the exception request analysis performed by the local computer;

prompting the analyst to enter using the remote computer at least one new policy value and corresponding data for a good based on the exception request analysis, the prompting is performed by transmitting a message from the local computer to the remote computer after performing an exception request analysis; and displaying the value of the good on the local computer for the requester.

2. A method according to claim 1 wherein said step of entering data into the local computer including a request comprises the step of submitting the data including the request for a value of the good and data relating to the good to the local computer via an Internet.

3. A method according to claim 1 wherein said step of entering data into the local computer including a request comprises the step of submitting the data including the request for a value of the good and data relating to the good to the local computer via an Intranet.

4. A method according to claim 1 wherein said step of uploading data entering data into the local computer comprises the step of accessing a local computer configured as a server.

5. A method according to claim 1 wherein said step of calculating the value further comprises the step of calculating the value from one of residual value, net realizable value, orderly liquidation value and purchase option value.

6. A method according to claim 1 wherein said step of entering data into the local computer including a request comprises the step of loading into the local computer at least one field configured for receiving and storing a new request for a value of a good.

7. A method according to claim 6 wherein said step of loading at least one field comprises the step of loading at least one field configured for editing the new request.

8. A method according to claim 6 wherein said step of loading at least one field comprises the step of loading at least one field configured for withdrawing the request.

9. A method according to claim 1 wherein said step of designating the request as an exception request comprises the step of loading at least one field configured for receiving and storing additional information for calculating a value for the exception request.

10. A method according to claim 9 wherein said step of designating the request as an exception request comprises the step of loading at least one field configured for storing and submitting the exception request and informing an analyst of the existence of the exception request.

11. A method according to claim 1 wherein said step of designating the request as an exception request comprises the step of analyzing trends in similar exception requests.

12. A method according to claim 11 wherein said step of analyzing trends in similar exception requests comprises the step of triggering an analyst to add additional policy values.

13. A method according to claim 1 wherein said step of entering data into the local computer comprises the step of uploading data to the local computer including a request for a value of equipment and data relating to the equipment, the computer configured as a calculator for calculating the value of the equipment.

14. A method according to claim 13 wherein said step of uploading data to the local computer comprises the step of uploading lease information to the local computer, the local computer configured as a calculator for calculating a value of the equipment.

15. A method according to claim 1 wherein said step of uploading data to the local computer further comprises the step of receiving data relating to at least one residual factor.

16. A method according to claim 1 wherein said step of entering data into the local computer further comprises the step of receiving and saving profile information of a new user.

17. A method according to claim 1 wherein said step of entering data further comprises the step of loading at least one field configured for receiving a comment with a request.

18. A method according to claim 1 wherein said step of entering data further comprises the step of updating matrix values.

19. A method according to claim 18 wherein said step of updating matrix values comprises the step of updating the matrix values from one of policy value, value stream and cell value.

20. A method according to claim 1 wherein said step of entering data further comprises a step of loading at least one field configured for receiving, storing and deleting information relating to a new good.

21. A method according to claim 1 wherein said step of calculating the value further comprises the step of calculating the value using at least one input policy value and input changes for calculating the value.

22. A method according to claim 1 wherein said step of calculating the value further comprises the step of querying existing requests.

23. A method according to claim 22 wherein said step of querying existing requests further comprises the step of querying predefined or customized requests.

24. A method according to claim 23 wherein said step of querying customized requests further comprises the step of receiving criteria data for the customized request.

25. A method according to claim 5 wherein said step of calculating the residual value of the good further comprises a step of calculating the residual value using at least one of:

[[(base value)+Σbase value modifiers]*residual value look up)*depreciation value look up,

[cost*residual value look up] and

[depreciation value look up*residual value look up]

for a lease term.

26. A method according to claim 5 wherein said step of calculating the net realizable value of the good comprises the step of calculating the net realizable value using at least one of:

([[(base value)+Σbase value modifiers]*net realizable value look up)*depreciation value look up,

[cost*net realizable value lookup] and

[depreciation value look up*net realizable value look up]

for a lease term.

27. A method according to claim 5 wherein said step of calculating the purchase option value of a good comprises the step of calculating the purchase option value using at least one of:

[residual value+((cost/quantity)*purchase option value look up)] and

[residual value+(cost*purchase option value look up)]

for a lease term.

28. A method according to claim 1 wherein said step of calculating the value comprises the step of cloning an existing request.

29. A method according to claim 1 wherein said step of entering data further comprises the step of uploading profile information to be received and stored.

30. A method according to claim 29 wherein said step of uploading profile information further comprises the step of uploading profile information from one of personal data, login information, password information, role information, organization information and preferences.

31. A method according to claim 29 wherein said step of uploading profile information further comprises the step of analyzing the profile information.

32. A method according to claim 1 wherein said step of displaying the value further comprises the step of displaying the value within a summary report.

33. A system for providing a value of a good to a requester, said system comprising:
    a first computer associated with a requester;
    a second computer associated with an analyst;
    a database for storing data relating to a plurality of goods including a description of each good and whether a policy value has been assigned to the good, wherein each good includes a non-stationary asset including at least one of equipment, a product, a truck, an automobile and a vehicle;
    a server coupled to said database and configured to read input data including a request for a value of the good and data relating to the good, said server further configured to:
        determine whether the value of the good can be calculated based on the inputted data including determining whether the good has a policy value assigned thereto,
        designate the request for the value of the good as an exception request if the server is unable to value the good based on the data stored within the database and the inputted data, a request for the value of a good is designated as an exception request if the server determines that the good does not have a policy value assigned thereto and that input from the analyst is required for valuing the good, transmit data to be displayed as a first web page on said first computer indicating that the request has been designated as an exception request and prompting the requester to provide additional information relating to the good, prompting the requester to transmit the inputted data and the additional information from the first computer, automatically transmitting data to be displayed as a second web page on said second computer notifying the analyst that the request has been designated as an exception request and prompting the analyst to research the value of the good using the inputted data, the additional information and data external to the database, calculate the value of the good based on the research performed by the analyst, analyze trends among a plurality of similar exception requests including the calculated values of the goods associated with the similar exception requests, prompting the analyst to enter at least one new policy value and corresponding data for a good based on the exception request analysis, the new policy value is transmitted from the second computer;

a network connecting said server to said first computer and said second computer; and a user interface in communication with the first computer for allowing the requester to input data relating to a request for the value of the good and data relating to the good and for receiving the value of the good output.

34. A system according to claim 33 wherein said server is configured to allow the requester to submit data relating to the request and data relating to the good via the Internet.

35. A system according to claim 33 wherein said server is configured to allow the requester to submit data relating to the request and data relating to the good via an Intranet.

36. A system according to claim 33 wherein said network is one of a wide area network and a local area network.

37. A system according to claim 33 wherein said server is configured to calculate one of a residual value, net realizable value, purchase option value and an orderly liquidation value.

38. A system according to claim 33 wherein said server is configured to read input data including a request for the value of equipment and data relating to the equipment and calculate the value of equipment.

39. A system according to claim 33 wherein said server is configured to read input data relating to lease information.

40. A system according to claim 33 wherein said interface is further configured with at least one field for receiving and storing a new request for a value of the good.

41. A system according to claim 40 wherein said interface is further configured with at least one field for editing the new request.

42. A system according to claim 40 wherein said interface is further configured with at least one field for withdrawing the request.

43. A system according to claim 33 wherein said server is further configured to store the exception request, inform an analyst of the existence of the exception request, and submit the exception request to the analyst for further analysis.

44. A system according to claim 33 wherein said server is configured for receiving and storing additional information for calculating the value for the exception request.

45. A system according to claim 33 wherein said server is configured for recognizing trends in similar exception requests.

46. A system according to claim 45 wherein said server is configured for triggering an analyst to add additional policy values.

47. A system according to claim 33 wherein said server is configured to calculate the value of the good using at least one input policy value and input changes for calculating the value.

48. A system according to claim 37 wherein said server is configured to calculate the residual value using at least one of:

$$([(base\ value)+\Sigma base\ value\ modifiers]*residual\ value\ look\ up)*depreciation\ value\ look\ up,$$

$$[cost*residual\ value\ look\ up]\ and$$

$$[depreciation\ value\ look\ up*residual\ value\ look\ up]$$

for a lease term.

49. A system according to claim 37 wherein said server is configured to calculate the net realizable value of the good using at least one of:

$$([(base\ value)+\Sigma base\ value\ modifiers]*net\ realizable\ value\ look\ up)*depreciation\ value\ look\ up,$$

$$[cost*net\ realizable\ value\ look\ up]\ and$$

$$[depreciation\ value\ look\ up*\ net\ realizable\ value\ look\ up]$$

for a lease term.

50. A system according to claim 37 wherein said server is configured to calculate the purchase value using at least one of:

$$[residual\ value+((cost/quantity)*purchase\ option\ adder\ matrix\ value\ look\ up)]\ and$$

$$[residual\ value+(cost*purchase\ option\ value\ look\ up)]$$

for a lease term.

51. A system according to claim 33 wherein said server is further configured for cloning an existing request.

52. A system according to claim 33 wherein said server is further configured to query existing requests.

53. A system according to claim 33 wherein said server is configured to query existing predefined or customized requests.

54. A system according to claim 53 wherein said server is further configured to upload criteria data for the customized requests.

55. A system according to claim 33 wherein said interface is further configured with fields for receiving and storing at least one residual factor.

56. A system according to claim 33 wherein said interface is further configured with at least one field for receiving and storing profile information.

57. A system according to claim 56 wherein said interface is further configured with at least one field for receiving and storing profile information selected from one of personal data, login information, password information, role information, organization information and preferences.

58. A system according to claim 56 wherein said interface is further configured with at least one field for analyzing the profile information.

59. A system according to claim 33 wherein said interface is further configured for receiving comments with the request.

60. A system according to claim 33 wherein said interface is further configured to allow updating of matrix values.

61. A system according to claim 60 wherein said interface is further configured to allow updating of matrix values from one of policy value, value stream and cell value.

62. A system according to claim 33 wherein said interface is further configured with fields for receiving, storing and deleting information relating to a new good.

63. A system according to claim 33 wherein said interface is further configured for displaying the value of the good within a summary report.

64. A method for providing a value of a good to a requester using a local computer coupled to a database and in communication with a remote computer, the remote computer controlled by an analyst, the method comprising the steps of:
- storing in the database data relating to a plurality of goods including a description of each good including at least one of a type, a manufacturer, a model, a quantity, and options, wherein each good includes a non-stationary asset including at least one of equipment, a product, a truck, an automobile and a vehicle;
- assigning a policy value to at least one good stored in the database;
- entering data into the local computer including a request for a value of a good and data relating to the good, the local computer configured as a calculator;
- using the local computer to determine whether the value of the good can be calculated based on the entered data including determining whether the good has a policy value assigned thereto;
- calculating the value of the good if the value can be calculated based on the entered data;
- designating the request for the value of the good as an exception request if the local computer is unable to value the good based on the data stored within the database and the entered data, a request for the value of a good is designated as an exception request if the local computer determines that the good does not have a policy value assigned thereto and that input from the analyst is required for valuing the good;
- displaying a web page on the local computer indicating that the request has been designated as an exception request and prompting the requester to provide additional information relating to the good;
- prompting the requester to transmit from the local computer the entered data and the additional information to the remote computer controlled by the analyst;
- researching by the analyst the value of the good including analyzing data external to the database based on the entered data and the additional information;
- calculating the value of the good based on the research performed by the analyst;
- analyzing trends among a plurality of similar exception requests including the calculated values of the goods associated with the similar exception requests, the exception request analysis performed by the local computer; and
- prompting the analyst to enter using the remote computer at least one new policy value and corresponding data for a good based on the exception request analysis, the prompting is performed by transmitting a message from the local computer to the remote computer after performing an exception request analysis.

65. A method for providing a value of a good to a requester using a local computer coupled to a database and in communication with a remote computer, the remote computer controlled by an analyst, said method comprising the steps of:
- uploading to the local computer data relating to a request for a value of a good and data relating to the good, the local computer configured as a calculator for calculating a value of the good, data relating to a good including at least one of a type, a manufacturer, a model, a quantity, and options, wherein each good includes a non-stationary asset including at least one of equipment, a product, a truck, an automobile and a vehicle;
- recognizing the request for the value of the good as an exception request if the local computer is unable to value the good based on the data stored within the database and the uploaded data, a request for the value of a good is designated as an exception request if the local computer determines that input from the analyst is required for valuing the good;
- prompting the requester to provide additional information relating to the good for an exception request;
- prompting the requester to transmit from the local computer the entered data and the additional information to the remote computer controlled by the analyst;
- researching by the analyst the value of the good including analyzing data external to the database based on the uploaded data and the additional information;
- calculating the value of the good based on the research performed by the analyst;
- analyzing trends among similar exception requests including the calculated values of the goods associated with the similar exception requests, the exception request analysis performed by the local computer; and
- inputting using the remote computer a new policy value and corresponding data for a good based on the exception request analysis to facilitate subsequent valuations of similar goods.

* * * * *